United States Patent
Ye et al.

(10) Patent No.: US 9,837,912 B2
(45) Date of Patent: Dec. 5, 2017

(54) SINGLE STAGE SWITCHING POWER CONVERTER WITH IMPROVED PRIMARY ONLY FEEDBACK

(71) Applicants: DIALOG SEMICONDUCTOR INC., Campbell, CA (US); DIALOG SEMICONDUCTOR (UK) LIMITED, London (GB)

(72) Inventors: Zhiqiu Ye, Beijing (CN); Nailong Wang, Beijing (CN); Yimin Chen, Campbell, CA (US); Xiaolin Gao, Campbell, CA (US)

(73) Assignees: DIALOG SEMICONDUCTOR INC., Campbell, CA (US); DIALOG SEMICONDUCTOR (UK) LIMITED, London (GB)

( * ) Notice: Subject to any disclaimer, the term of this patent is extended or adjusted under 35 U.S.C. 154(b) by 0 days.

(21) Appl. No.: 15/423,335

(22) Filed: Feb. 2, 2017

(65) Prior Publication Data
US 2017/0149340 A1    May 25, 2017

Related U.S. Application Data

(63) Continuation of application No. PCT/CN2015/083608, filed on Jul. 8, 2015.

(51) Int. Cl.
*H02M 3/335* (2006.01)
*H02M 1/08* (2006.01)
*H02M 1/00* (2006.01)

(52) U.S. Cl.
CPC ......... *H02M 3/33507* (2013.01); *H02M 1/08* (2013.01); *H02M 2001/0009* (2013.01)

(58) Field of Classification Search
CPC ............ H02M 3/22; H02M 3/24; H02M 3/28; H02M 3/325; H02M 3/33507; H02M 3/33523; H02M 1/08; H02M 1/081; H02M 1/082; H02M 1/42; H02M 1/425; H02M 1/4258; H02M 1/4208; H02M 2001/0003; H02M 2001/0032; H02M 2001/0025; H02M 2001/0009; H02M 2001/4275; Y02B 70/1416; Y02B 70/1433; Y02B 70/1491; Y02B 70/126
(Continued)

(56) References Cited

U.S. PATENT DOCUMENTS 5,508,904 A    4/1996 Hara
7,157,886 B2   1/2007 Agarwal et al.
(Continued)

FOREIGN PATENT DOCUMENTS

CN    1111771 A    11/1995
CN    1706089 A    12/2005
(Continued)

OTHER PUBLICATIONS

PCT Search Report and Written Opinion dated Mar. 24, 2016 from corresponding International Application No. PCT/CN2015/083608.

*Primary Examiner* — Timothy J Dole
*Assistant Examiner* — Carlos Rivera-Perez
(74) *Attorney, Agent, or Firm* — Haynes and Boone, LLP

(57) ABSTRACT

A switching power converter is provided that extrapolates from a reference voltage during dead periods of a rectified input voltage as determined from a comparison of an Isense voltage to a current threshold.

20 Claims, 6 Drawing Sheets

(58) Field of Classification Search
USPC .. 363/15–21.18, 40–43, 74, 89, 95–99, 123, 363/131–134; 323/205–211, 271–277, 323/280–287, 299–303, 351
See application file for complete search history.

(56) References Cited

U.S. PATENT DOCUMENTS

| | | |
|---|---|---|
| 9,125,265 B2 | 9/2015 | Kojima et al. |
| 2014/0016376 A1* | 1/2014 | Gao ................ H02M 3/33507 363/21.17 |
| 2015/0103566 A1* | 4/2015 | Keogh .............. H02M 3/33507 363/21.12 |
| 2015/0160270 A1* | 6/2015 | Shi .................. H02M 3/33515 363/21.13 |

FOREIGN PATENT DOCUMENTS

| | | |
|---|---|---|
| CN | 102332814 A | 1/2012 |
| CN | 102958246 A | 3/2013 |
| CN | 104578799 A | 4/2015 |

* cited by examiner

SINGLE STAGE SWITCHING POWER CONVERTER WITH IMPROVED PRIMARY ONLY FEEDBACK

CROSS-REFERENCE TO RELATED APPLICATIONS

This application is a continuation of International Application No. PCT/CN2015/083608, filed Jul. 8, 2015.

TECHNICAL FIELD

This application relates to switching power converters, and more particularly to a switching power converter with improved primary feedback.

BACKGROUND

Single-stage AC-DC power conversion is a low cost and thus popular power supply topology. In a single-stage AC-DC power converter, the AC line voltage is rectified to produce a rectified input voltage that cycles from approximately zero volts to the peak line voltage (e.g., 1.414*120 V in the US) at twice the AC frequency. Single-stage AC-DC switching power converters include a power switch that cycles multiple times during each cycle of the rectified input voltage. Each time the power switch cycles, a pulse of power is delivered to the load. During the bulk of each rectified input voltage cycle, the rectified input voltage level is relatively high such that a significant amount of power is delivered to the load with every cycle of the power switch. But during the "dead" period of each rectified input voltage cycle in which the rectified input voltage weakens and drops to 0 V, the power delivery with each cycle of the power switch is relatively weak.

This weak power delivery during the dead period between the rectified input voltage peaks complicates the output voltage regulation in indirect control topologies that use a sense voltage from an auxiliary winding such as practiced in single-stage flyback power converters using primary-only feedback. Flyback converters are commonly used as the switching power converter in a single-stage AC-DC architecture. But the isolation between the output voltage on the secondary side of the transformer and the primary side of the transformer in a flyback converter complicates its regulation. The output voltage may be sensed using optoisolators but that raises costs and control complication. In contrast, primary-only feedback control techniques determine the output voltage by sampling the reflected voltage on an auxiliary winding at the transformer reset time. When the rectified input voltage is relatively high, the pulse of energy delivered to the load at each cycle of the power switch is relatively robust such that there is a linear relationship between the reflected voltage and the output voltage. But this linear relationship becomes muddied for the "runt" pulses delivered to the load during the dead period between consecutive rectified input voltage peaks. The primary-only feedback loop thus operates with erroneous output voltage information during the dead periods due to the breakdown in the linear relationship between the reflected voltage and the output voltage for the runt pulses.

This degradation for primary-only feedback control systems is problematic in that a single-stage AC-DC switching power converter may be designed for world-wide use to lower costs and take advantage of mass production efficiencies. But the power line cycling varies across the world depending upon the vagaries of a particular country's electrical power providers. For example, the United States operates with a 60 Hz 120 V (RMS) AC main whereas many other countries such as in Europe operate with a 50 Hz 230 V (RMS) AC main. The control loop in a single-stage AC-DC switching power converter designed for world-wide usage must accommodate these diverse inputs while still keeping their output power to the load within the desired regulation. But such regulation is weakened due to the dead periods of the rectified input voltage cycles for feedback systems that use a sense voltage from an auxiliary winding instead of sampling the output voltage directly such as through optoisolators.

Accordingly, there is a need in the art for improved primary-only regulation of single-stage AC-DC switching power converters.

SUMMARY

A single-stage switching power converter is provided that includes a tracking circuit that adjusts a reference voltage to track an output voltage using a sense voltage from an auxiliary winding. The single-stage switching power converter also includes a comparator for comparing an on-time current produced from a power switch on-time to a current threshold to determine when the sense voltage is trustable and when the sense voltage is non-trustable. The single-stage switching power converter includes an extrapolator that determines in each cycle of a rectified input voltage a first trustable value for the reference voltage and a last trustable value for the reference voltage responsive to when the sense voltage is trustable and non-trustable as determined by the comparator. The extrapolator extrapolates from the first trustable value and the last trustable value to provide an extrapolated reference voltage while the sense voltage is non-trustable that substantially equals the output voltage The resulting extrapolation is quite advantageous because the single-stage switching power converter may control its power switch while the sense voltage is non-trustable using the extrapolated reference voltage. Since this extrapolated reference voltage substantially equals the output voltage while the sense voltage is non-trustable, the output power regulation is considerably improved as compared to a conventional techniques.

These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To address the need for improved regulation in single-stage AC-DC switching power converters with primary-only output voltage regulation, the current through the power switch during the power switch cycles is compared to a threshold to distinguish between relatively-high-power power pulses delivered to the load versus the delivery of low-power power pulses. This improved regulation may be applied to any suitable switching power converter architecture including flyback, buck, and boost switching power converter architectures. The following discussion will be directed to a flyback converter topology without loss of generality in that the same principles may be applied to other single-stage switching power converter architectures that use a sense voltage obtained from an auxiliary winding such as performed in primary-only feedback systems. For those power pulses that satisfy the threshold, the output voltage regulation occurs in a conventional fashion in that the output voltage is represented by a reference voltage Vref that is compared to the primary winding reflected voltage (Vsense). As the primary winding reflected voltage changes due to the changing amounts of power delivered to the load in each cycle of the power switch, the reflected voltage changes to track the output voltage (Vout) applied to the load. Such tracking is conventional and may be performed using a gap judgment as explained further herein.

But as the rectified input voltage cycles into a dead period, the power pulses delivered to the load become smaller and smaller. The resulting reflected voltages on the primary winding during the off period in each power switch cycle will then no longer accurately reflect the output voltage Vout. Such faulty reflected voltage pulses are denoted herein as "runt" pulses. The peak current through the primary winding during each on period of the power switch cycle will also fall as the rectified input voltage falls such that the peak current will fall below the current threshold at a time denoted herein as the "last trustable point." The corresponding reference voltage at this time may thus be denoted as the "last trustable voltage reference." As the rectified input voltage begins again to cycle high, the peak current will increase until it exceeds the current threshold at a time denoted herein as the "first trustable point." The corresponding reference voltage at the first trustable point may thus be denoted as the "first trustable reference voltage."

Figure 1A:
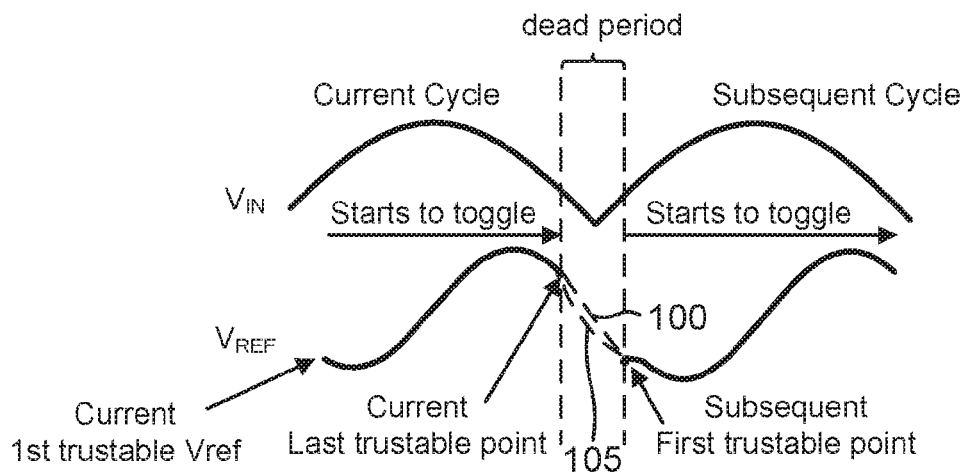
FIG. 1A illustrates a linear and a curvilinear extrapolation of the reference voltage during the dead period between two cycles of the rectified input voltage in accordance with an embodiment of the disclosure.

In any given cycle of the rectified input voltage, there will thus be a current first trustable reference voltage and a current last trustable reference voltage. These two values may be used to extrapolate what the reference voltage should be from the time of the current last trustable reference voltage in a given rectified input voltage cycle until a subsequent first trustable reference voltage occurs in a subsequent rectified input voltage cycle. This extrapolation may be better appreciated with regard to FIG. 1A, which shows a current cycle for the rectified input voltage Vin followed by a subsequent cycle of the rectified input voltage Vin. In addition, the reference voltage Vref resulting from these two cycles of the rectified input voltage is also shown in FIG. 1A. A current threshold for the primary winding current (not illustrated) is used to detect when the current first trustable Vref value occurs in the current cycle of the rectified input voltage Vin. At this point, the reference voltage Vref is said to "toggle" in that it is changed from power-switch-cycle-to-power-switch-cycle in a conventional fashion as discussed earlier. But as the primary winding current again drops below the current threshold, the current last trustable Vref value is detected in the current cycle of the rectified input voltage Vin. Until the subsequent first trustable Vref value is detected in the subsequent cycle of the rectified input voltage Vin, the sensed voltage (not illustrated) is no longer trustable as discussed earlier. But it may be assumed during this dead period of the rectified input voltage that the reference voltage should continue following its regular sinusoidal pattern that is induced from the sinusoidal profile of the rectified input voltage. During the dead period, it may thus be assumed that the subsequent first trustable value for Vref will equal the current first trustable value for Vref. Moreover, the duration of the dead period may be assumed to be the same from cycle-to-cycle of the rectified input voltage Vin. Given these reasonable assumptions, a linear extrapolation for Vref for each power switch cycle in the dead period equals: Vref (linear extrapolated) =current last trustable value for Vref−((current first trustable value for Vref−current last trustable value for Vref)*(current expired fraction of the dead period). The "current expired fraction of the dead period" represents the fraction of the dead period that has expired at a given time within the dead period for the current cycle of the rectified input voltage Vin. For example, for a power switch cycle occurring in the exact middle of the dead period, the current expired fraction would be 0.5. Similarly, for a power switch cycle at the end of the dead period, the current expired fraction would be 1, and so on. Rather than digitally calculate the linear extrapolation, analog methods may be used. For example, a ramp generator may be configured to linearly ramp an extrapolated Vref over the dead period, wherein the linear ramp starts from the current last trustable value for Vref and ends at the current first trustable value for Vref. Similarly, both digital and analog techniques may be used to provide a curvilinear extrapolation of Vref.

Figure 1B:
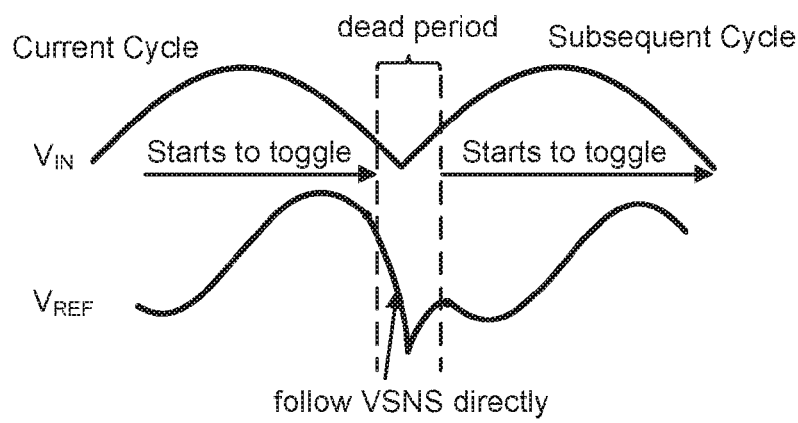
FIG. 1B illustrates the reference voltage for two cycles of the rectified input voltage without any extrapolation.

The resulting linear extrapolation for Vref during the dead period is represented by a line 100 in FIG. 1A. Alternatively, a curvilinear fitting may be used to extrapolate Vref during the dead period as represented by a line 105. Regardless of whether Vref is linearly or curvilinearly extrapolated between the first and last trustable values for Vref during the dead period, note how advantageous the resulting regulation is over a conventional method such as shown in FIG. 1B. In this conventional method, Vref continues to track the sensed voltage even during the dead period. As a result, Vref drops substantially to zero during the dead period since Vref is being toggled with regard to a non-trustable primary winding reflected voltage during the dead period. The resulting conventional regulation during the dead period is thus based upon a Vref that is no longer representative of the output voltage during the dead period. In sharp contrast, the use of the extrapolated Vref during the dead period as discussed with regard to FIG. 1A provides a much more accurate representation of the output voltage and thus provides a tighter regulation of the output voltage (or output current).

Figure 1C:
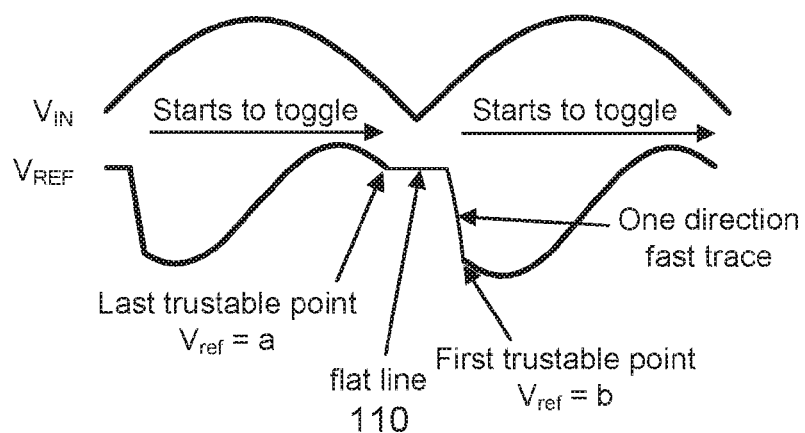
FIG. 1C illustrates a constant-level extrapolation of the reference voltage during the dead period between two cycles of the rectified input voltage ion accordance with an embodiment of the disclosure.

Rather than use an extrapolated reference voltage, the current last trustable reference voltage may be detected using the current threshold on the primary winding current and then maintained constant during the dead period as shown in FIG. 1C for a flat line 110 until the subsequent first trustable reference voltage is detected using the current threshold on the primary winding current. At that point, the conventional toggling of the reference voltage would commence starting from the first trustable reference voltage value. Although such a constant Vref is more accurate than the prior art method discussed with regard to FIG. 1B, a comparison of flat line 110 with either linear extrapolated Vref 100 or curvilinear extrapolated Vref 105 of FIG. 1A shows that a linear (or curvilinear) extrapolation of the reference voltage during the dead period provides much better regulation of the output voltage during the dead period.

Figure 2:
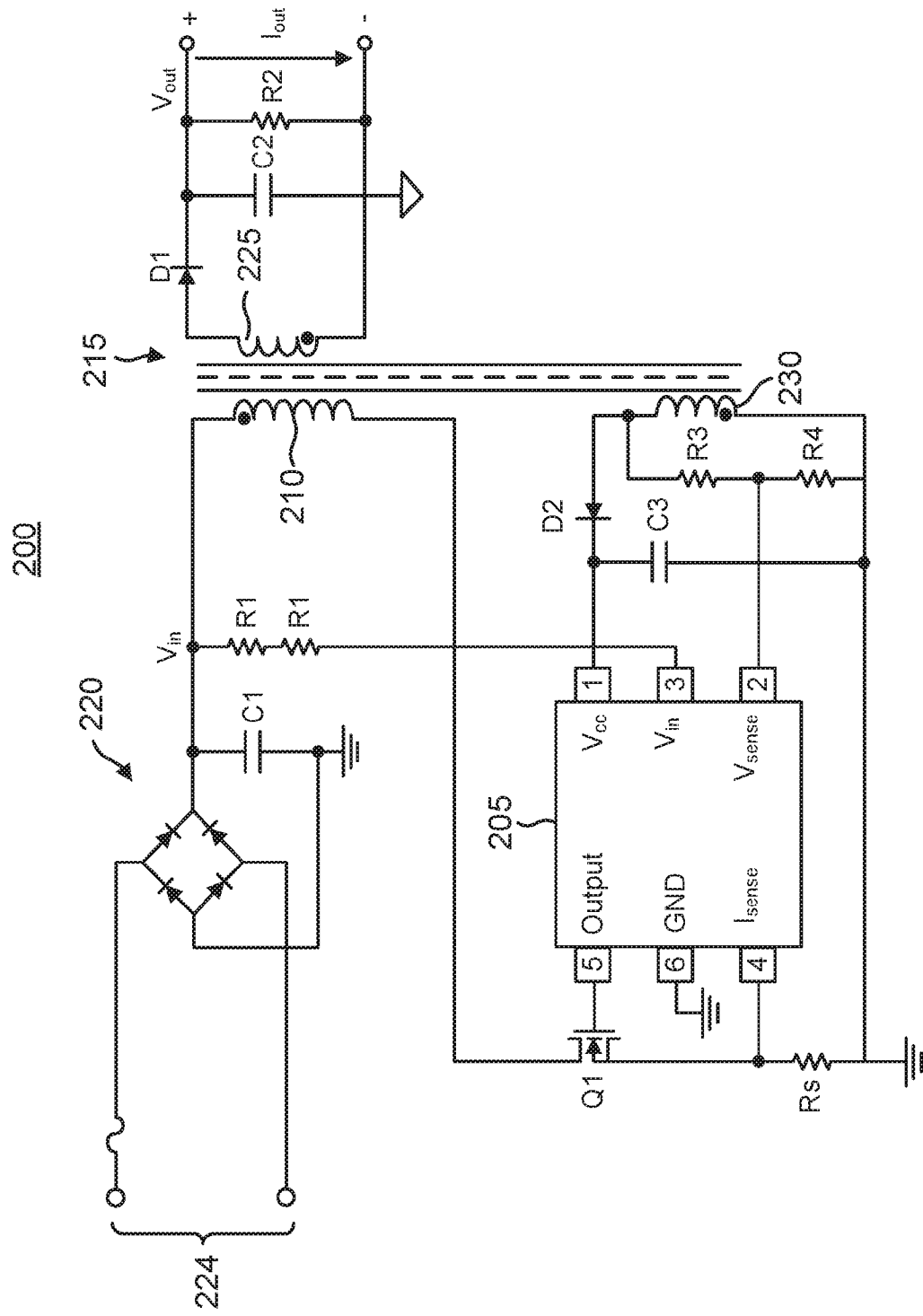
FIG. 2 illustrates a flyback converter including a controller configured to practice a reference voltage extrapolation in accordance with an embodiment of the disclosure.

An example single-stage flyback converter 200 is shown in FIG. 2. A controller integrated circuit 205 for flyback converter controls the switching of a power switch such as an NMOS transistor Q1. In alternative embodiments, the power switch may be implemented using a bipolar junction transistor. Controller 205 controls a gate voltage for power switch transistor Q1 through an output pin 5. When switched on, power switch transistor Q1 allows a primary current to flow through a primary winding 210 of a transformer 215 responsive to the rectified input voltage Vin. A rectifier 220 including a diode bridge and a capacitor C1 rectifies the alternating line voltage carried on an AC main 224 to provide the rectified input voltage Vin. The rectified input voltage Vin thus still retains a pronounced sinusoidal profile across each half of an AC main cycle.

For each cycle of power switch transistor Q1, the primary winding current ramps up from zero to a peak winding current value that depends upon the input voltage Vin, the switch on time, and the inductance for primary winding 210. When power switch transistor Q1 cycles off, a secondary winding current flows across a second winding 225 in transformer 215, starting from a peak value and continuing to ramp down to zero. An output capacitor C2 and a resistor R2 stabilize a resulting output voltage Vout produced by the second winding current. A diode D1 prevents the secondary winding current from flowing while the primary winding conducts. Alternatively, diode D1 may be replaced by a transistor switch as is conventional for a flyback converter with synchronous rectification. The secondary winding current produces a reflected voltage across primary winding 210 and also across an auxiliary winding 230 for transformer 215. Diode D1 will have a voltage drop across it that prevents a direct relationship between the reflected voltage and the output voltage while the secondary current still flows. But when the secondary current ramps to zero (the transformer reset time), there is no voltage drop across diode D1 such the resulting reflected voltage at that time is directly related to the output voltage. By controlling the reference voltage to track the reflected voltage across auxiliary winding 230 at this transformer reset time, controller 205 thus may determine the output voltage Vout as known in the primary-only feedback arts as represented by the reference voltage. For example, controller 205 may include a Vsense pin 2 that samples the reflected voltage across auxiliary winding 230 through a voltage divider formed by a pair of resistors R3 and R4. The reflected voltage may also be rectified through a diode D2 and a capacitor C3 to form a power supply voltage VCC received by controller 205 at a power pin 1.

Controller 205 may include a ground pin 6 and a current sense (Isense) pin 4 that samples the primary winding current through the voltage produced across a sampling resistor Rs coupled to a source of power switch transistor Q1. In some embodiments, controller 205 may determine the rectified input voltage Vin indirectly through the Isense pin voltage. However, controller 205 may also include a Vin pin 3 for directly sampling the rectified input voltage Vin through one or more resistors R1.

Figure 3:
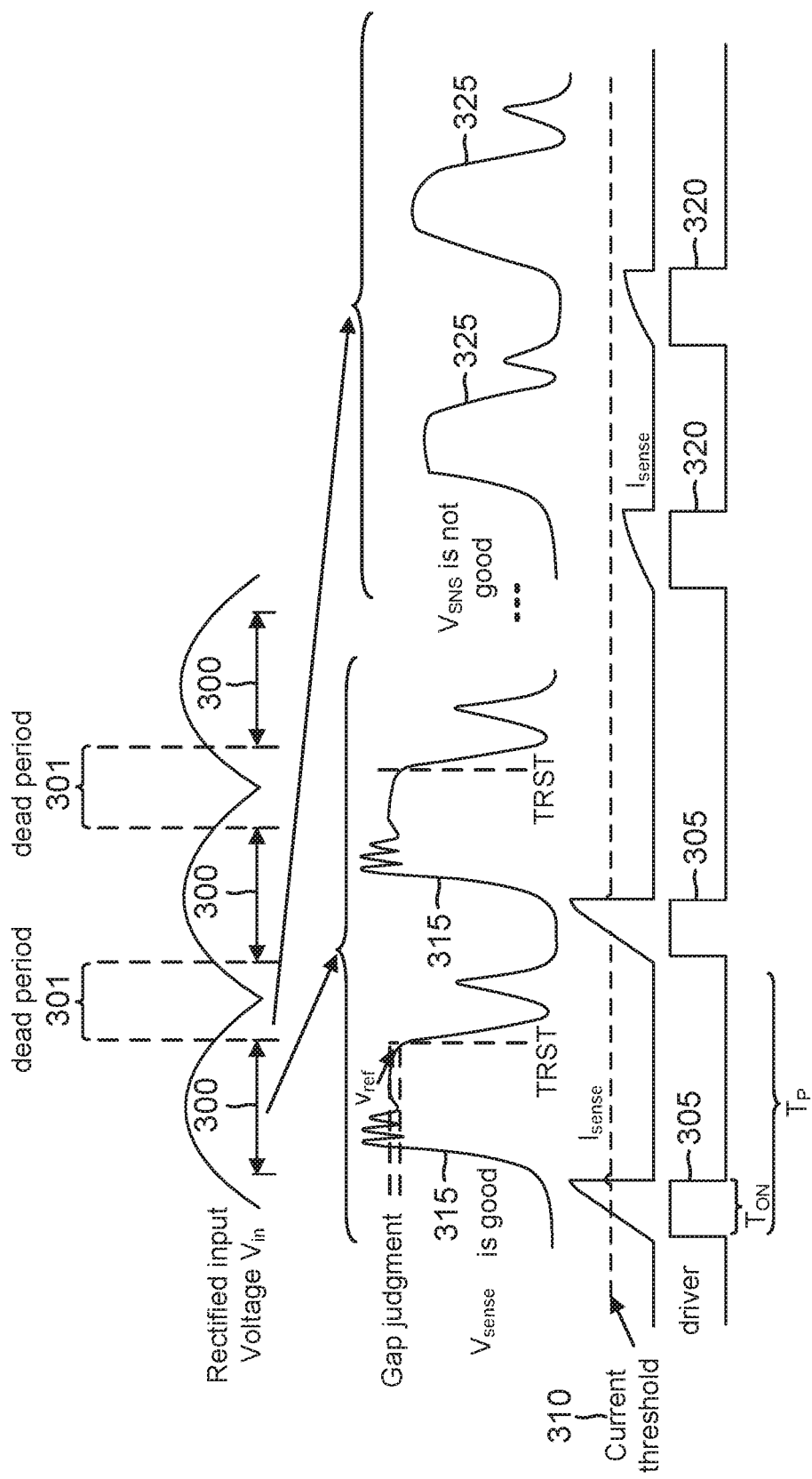
FIG. 3 illustrates the Vsense and Isense voltage waveforms for both a Vsense OK period of the rectified input voltage and for a dead period of the rectified input voltage in accordance with an embodiment of the disclosure.

Controller 205 may then compare the Isense voltage to the current threshold to determine whether the reflected voltage Vsense is trustable as shown in FIG. 3 for three consecutive cycles of the rectified input voltage Vin. From cycle to cycle of the rectified input voltage, there is a dead period 301 during which the rectified input voltage amplitude is relatively low. Outside of these dead periods, the rectified input voltage amplitude is relatively high such that relatively large amounts of power are pulsed to the load with each cycle of the power switch. For example, consider an initial period 300 for an initial cycle of the rectified input voltage. The on-time periods 305 for two cycles of the power switch (not illustrated) are shown in FIG. 3 for the initial period 300. Because of the relatively robust rectified input voltage during the initial period 300, each on-time period 305 of the power switch produces a peak winding current as represented by the Isense voltage that exceeds a current threshold 310. The corresponding reflected voltages as represented by Vsense pulses 315 from the on-time periods 305 will thus accurately reflect the output voltage at the transformer reset time (TRST). Controller 205 (FIG. 2) may thus proceed to control the reference voltage in a conventional fashion during periods 300.

But current threshold 310 is not satisfied during dead periods 301. For example, consider an initial one of dead periods 301. The on-time periods 320 for the power switch during this initial dead period 301 will not produce an Isense voltage that exceeds current threshold 310. The corresponding reflected pulses 325 thus no longer have an accurate relationship to the output voltage at the transformer reset times as is the case for trustable reflected pulses 315. But this problem is solved by extrapolating Vref during the dead periods as discussed earlier.

Figure 4:
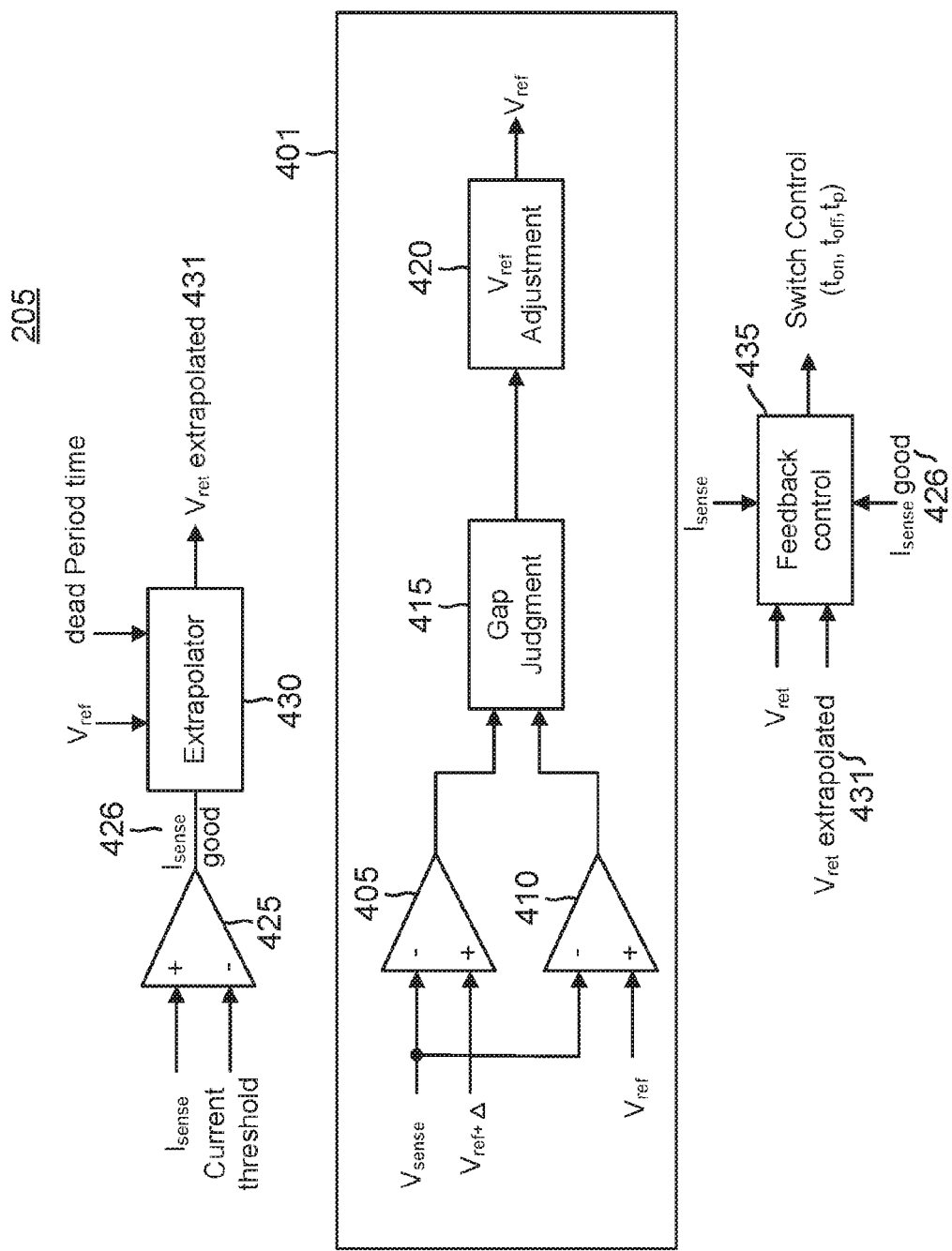
FIG. 4 is a block diagram of the controller of FIG. 2 in accordance with an embodiment of the disclosure.

A block diagram for the relevant portions of controller 205 for carrying out the adaptive extrapolation of the reference voltage during the dead periods is shown in FIG. 4. Controller 205 includes a conventional Vref tracking circuit 401 that functions to adapt the reference voltage Vref responsive to the amplitude of the Vsense voltage at the transformer reset time. The detection of the transformer reset time may be accomplished using a variety of techniques. For example, Vref may be compared to Vsense at a first comparator 410. Similarly, Vref may be summed with a positive offset voltage Δ (e.g., tens of millivolts) and the resulting sum voltage compared with Vsense in a second comparator 405. At the transformer reset time, a desired time gap will exist between when second comparator 405 detects that the sum voltage and the Vsense are equal as compared to when first comparator 410 detects that the reference voltage Vref and Vsense are equal. Should the reference voltage Vref be too high, this time gap will increase above the desired value. Conversely, if the reference voltage Vref is too low, the time gap will decrease below the desired value. A gap judgment module 415 compares the current time gap between the assertions of the output signals from comparators 405 and 410 to the desired time gap value. Based upon the comparison in gap judgment module 415, a reference voltage adjustment module 420 adjusts the amplitude of the reference voltage Vref. For example, if the current gap value is too large, reference voltage adjustment module 420 may lower the amplitude for the reference voltage Vref. On the other hand, should the current gap value equal the desired gap value (or be within a desired tolerance), reference voltage adjustment module 420 may leave the amplitude of the reference voltage unchanged. Finally, if the current gap value is too small as compared to the desired gap value, reference voltage adjustment module 420 may increase the amplitude of the reference voltage Vref. In this fashion, the gap judgment causes the reference voltage Vref to track the output voltage when Vsense is trustable. It will be appreciated that other techniques to track the reference voltage Vref with regard to the output voltage Vout may be used during the trustable periods of Vsense.

A comparator 425 may be used to determine when Isense exceeds the current threshold to assert an Isense good command 426 during the trustable periods of Vsense. An extrapolator 430 samples the reference voltage responsive to the de-assertion and assertion of Isense good command 426 to determine the current first trustable Vref value and current last trustable Vref value during each cycle of the rectified input voltage. Based upon the current expired fraction of the dead period as discussed earlier and the current first and last trustable Vref values, extrapolator 430 may generate a current extrapolated Vref value 431 such as by using the linear or curvilinear extrapolation techniques discussed earlier.

Controller 205 includes a primary-only feedback control circuit 435 that operates in a conventional fashion responsive to the reference voltage Vref and Isense during the trustable periods in which Isense good command 426 is asserted. The resulting primary only feedback control may be based upon a peak current control or a constant on time control of the power switch as known in the power converter arts. The resulting switch control may control the on time (ton), the off time (toff) or the power switch period (tp) as is also known in the power converter arts. Feedback control circuit 435 continues to perform the same conventional control when Isense good command 426 is not asserted except that the extrapolated reference voltage 431 is substituted in place of the reference voltage. In this fashion, the resulting regulation is much more accurate during the non-trustable periods when Isense good command 426 is not asserted.

Figure 5A:
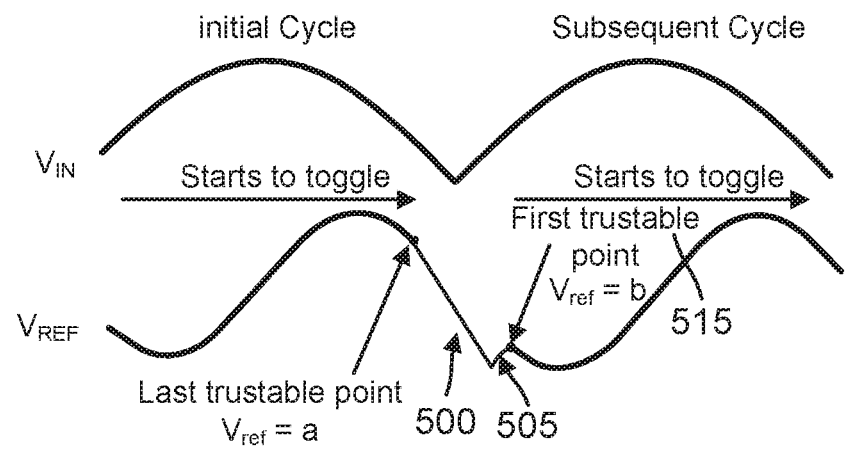
FIG. 5A illustrates a Vref extrapolation during a dead period in which the load is increasing its power consumption.
Figure 5B:
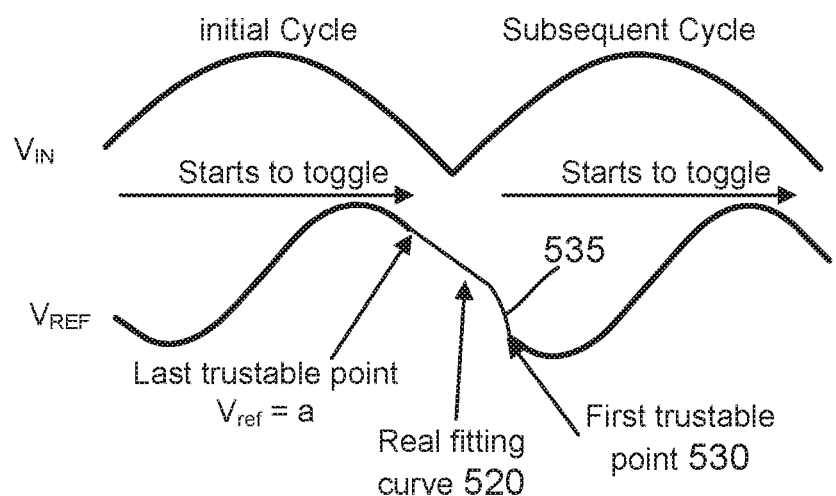
FIG. 5B illustrates a Vref extrapolation during a dead period in which the load is decreasing its power consumption.

Since the values of the current first and last trustable reference voltages are used to extrapolate from the current last trustable reference voltage, it may be the case that the load demand changes during the dead period extending from the current last trustable reference voltage. In other words, the past behavior of the load demand is used to predict the future behavior of the load demand. Such an assumption is relatively accurate for substantially static loads such as a powered LED. But it may be the case that the assumption introduces some inaccuracies due to vagaries in the load demand. For example, FIG. 5A illustrates the Vref extrapolation in the dead period between the last trustable Vref value in an initial cycle of the rectified input voltage and a subsequent cycle of the rectified input voltage. In the subsequent cycle, the load demand has increased such that a subsequent first trustable value 515 of Vref is higher than the minimum value reached by extrapolated Vref 500. There is thus a sudden increase 505 between the minimum value for extrapolated Vref 500 and subsequent first trustable Vref value 515. The converse situation is shown in FIG. 5B for an initial cycle and a subsequent cycle of the rectified input voltage in which the load demand decreases from the initial cycle to the subsequent cycle. The minimum value during the dead period between the two cycles for an extrapolated Vref 520 will thus be too high as compared to a subsequent first trustable value 530 of Vref. There will thus be a sudden decrease 535 from the minimum value for extrapolated Vref 520 to subsequent first trustable value 530 of Vref. Although these changes in the load demand produced undesirable inaccuracies in the extrapolated Vref, note that the extrapolation is adaptive. In other words, the subsequent first trustable value of Vref becomes the current first trustable value of Vref for the next cycle of the rectified input voltage. The extrapolation will thus adapt to these load changes so as to accurately regulate the output power accordingly.

Figure 6:
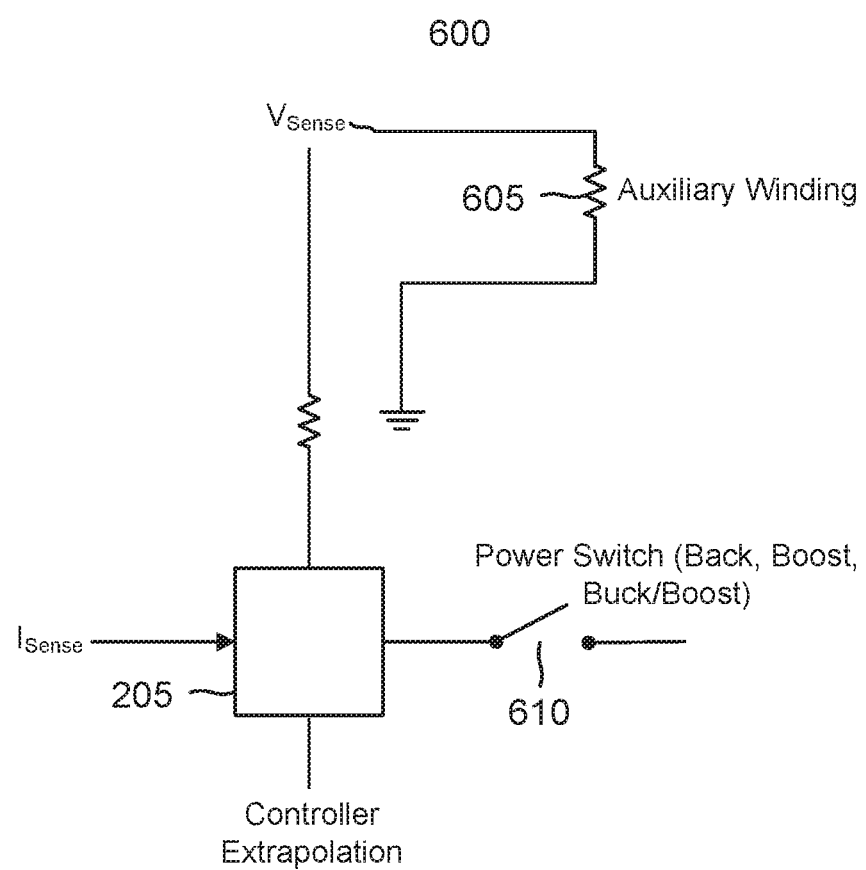
FIG. 6 illustrates a generic power converter including a controller configured to extrapolate from the reference voltage during dead periods of the rectified input voltage in accordance with an embodiment of the disclosure.

Although the preceding discussion was directed to a flyback converter topology, note that it is conventional to indirectly sense the output voltage in other types of switching power converters using a reflected voltage on an auxiliary winding such as practiced in buck switching power converters or boost switching power converters. Such switching power converters would thus include a tracking circuit equivalent to Vref tracking circuit 401 discussed above that would toggle a reference voltage based upon the sense voltage from the auxiliary winding so that the reference voltage tracks the output voltage. These other switching power converter topologies would thus suffer the same problem of non-trustable "runt" pulses on the auxiliary winding during the dead periods for the rectified input voltage. For example, a generic switching power converter 600 is illustrated in FIG. 6 that may be a buck switching power converter, a boost switching power converter, a buck/boot switching power converter, or any other suitable switching power converter that uses a sense voltage derived from an auxiliary winding 605. Controller 205 is configured to extrapolate the reference voltage during the dead periods as discussed herein to control the cycling of a power switch 610. Accordingly, the reference voltage extrapolation techniques discussed herein are widely applicable to any single-stage switching power converter that tracks the output voltage indirectly using a sense voltage from an auxiliary winding.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A method of controlling a switching power converter, comprising:
 comparing an on-time current produced from each cycle of a power switch to a current threshold to determine whether a sense voltage pulse produced on an auxiliary winding from each cycle of the power switch is trustable or non-trustable, and wherein consecutive cycles of a rectified input voltage are separated by a dead period in which the sense voltage pulses are non-trustable;

during each trustable sense voltage pulse, adjusting a reference voltage responsive to the trustable sense voltage pulse;

during each rectified input voltage cycle, determining a first trustable value of the voltage reference resulting from an initial one of the trustable sense voltage pulses in the rectified input voltage cycle and determining a last trustable value of the voltage reference resulting from a final one of the trustable sense voltage pulses in the rectified input voltage cycle;

for each dead period, extrapolating from the first trustable value of the reference voltage and the last trustable value to produce an extrapolated reference voltage; and controlling the cycling of the power switch during each dead period responsive to the extrapolated reference voltage.

2. The method of claim 1, further comprising controlling the cycling of the power switch outside of each dead period responsive to the reference voltage.

3. The method of claim 1, wherein extrapolating from the first trustable value of the reference voltage and from the last trustable value of the reference voltage comprises linearly extrapolating from the last trustable value of the reference voltage to the first trustable value of the reference voltage.

4. The method of claim 1, wherein extrapolating from the first trustable value of the reference voltage and from the last trustable value of the reference voltage comprises curvilinearly extrapolating from the last trustable value of the reference voltage to the first trustable value of the reference voltage.

5. The method of claim 1, wherein adjusting the reference voltage causes the reference voltage to track an output voltage of a flyback converter.

6. The method of claim 1, wherein adjusting the reference voltage causes the reference voltage to track an output voltage of a buck converter.

7. The method of claim 1, wherein adjusting the reference voltage causes the reference voltage to track an output voltage of a boost converter.

8. The method of claim 1, wherein adjusting the reference voltage occurs responsive to a gap duration derived from a comparison of the trustable sense voltage pulse to the reference voltage and from a comparison of a sum of the reference voltage and an offset voltage to the trustable sense voltage pulse.

9. The method of claim 1, further comprising: rectifying an AC main voltage to produce the cycles of the rectified input voltage.

10. The method of claim 1, wherein controlling the cycling of the power switch comprises controlling a current cycle of the power switch responsive to a peak value of the on-time current corresponding to a preceding cycling of the power switch.

11. A switching power converter, comprising:
a comparator configured to compare an Isense signal representative of an on-time current from each cycle of a power switch to a current threshold to determine whether a sense voltage pulse produced on an auxiliary winding from the cycle of the power switch is a trustable sense voltage pulse or a non-trustable sense voltage pulse;
a tracking circuit configured to adjust a reference voltage responsive to each trustable sense voltage; and
an extrapolator configured to determine for each cycle of a rectified input voltage a first trustable value of the voltage reference resulting from an initial one of the trustable sense voltage pulses in the rectified input voltage cycle and to determine a last trustable value of the voltage reference resulting from a final one of the trustable sense voltage pulses in the rectified input voltage cycle, wherein the extrapolator is further configured to extrapolate from the first trustable value of the reference voltage and the last trustable value of the reference voltage to produce an extrapolated reference voltage during a dead period of each rectified input voltage cycle in which the sense voltage pulses are non-trustable.

12. The switching power converter of claim 11, wherein the power switch comprises a MOSFET.

13. The switching power converter of claim 11, wherein the power switch comprises a bipolar junction transistor.

14. The switching power converter of claim 11, wherein the switching power converter is selected from a group consisting of a flyback converter, a buck converter, and a boost converter.

15. The switching power converter of claim 11, further comprising a control circuit configured to control the cycling of the power switch during each dead period responsive to the extrapolated reference voltage.

16. The switching power converter of claim 15, wherein the control circuit is further configured to control the cycling of the power switch outside of each dead period responsive to the reference voltage.

17. The switching power converter of claim 11, wherein the auxiliary winding is the auxiliary winding for a transformer.

18. The switching power converter of claim 11, wherein the extrapolator is further configured so that the extrapolation of the extrapolated reference voltage is a linear extrapolation.

19. The switching power converter of claim 11, wherein the extrapolator is further configured so that the extrapolation of the extrapolated reference voltage is a piece-wise linear extrapolation.

20. The switching power converter of claim 11, wherein the extrapolator is further configured so that the extrapolation of the extrapolated reference voltage is a curvilinear extrapolation.

* * * * *